United States Patent [19]

Dews et al.

[11] 3,859,139

[45] Jan. 7, 1975

[54] NOVEL COMPOSITE FUEL CELL ELECTRODE

[75] Inventors: George H. Dews, Glastonbury, Conn.; Daniel Eichner, Jacksonville Beach, Fla.; Fred S. Kemp, Rockville, Conn.

[73] Assignee: United Aircraft Corporation, East Hartford, Conn.

[22] Filed: Jan. 11, 1974

[21] Appl. No.: 432,647

[52] U.S. Cl. ......................... 136/120 FC, 136/86 D
[51] Int. Cl. ........................................... H01m 27/04
[58] Field of Search ........ 136/120 FC, 120 R, 86 D; 264/41, 51, 344

[56] References Cited
UNITED STATES PATENTS

| | | | |
|---|---|---|---|
| 3,238,068 | 3/1966 | Hipp | 136/120 FC |
| 3,297,484 | 1/1967 | Niedrach | 136/120 FC X |
| 3,395,049 | 7/1968 | Thompson | 136/120 FC X |
| 3,419,900 | 12/1968 | Elmore et al. | 136/120 FC X |

FOREIGN PATENTS OR APPLICATIONS

| | | | |
|---|---|---|---|
| 935,415 | 8/1963 | Great Britain | 136/120 FC |

*Primary Examiner*—Anthony Skapars
*Attorney, Agent, or Firm*—Stephen E. Revis

[57] ABSTRACT

Method of making a composite electrolyte matrix-/electrode assembly comprising filling the pores of a porous hydrophilic matrix resistant to alkali or acid electrolyte with a completely volatile filler such as water, solidifying the filler, applying a catalytic mixture to the surfaces of the matrix while the filler is in the solidified form, and thereafter removing the filler. The filler, being present while the catalyst is applied to the matrix, prevents the catalytic particles which are electrically conductive from impregnating the matrix which can cause internal cell shorting. Further, a catalyst layer with a uniform, flat surface is obtained.

10 Claims, No Drawings

3,859,139

NOVEL COMPOSITE FUEL CELL ELECTRODE

FIELD OF INVENTION AND BACKGROUND

This invention relates to improved fuel cell units and, more particularly, to a fuel cell unit having a high electrical power density due to the compactness of the individual cells without susceptibility of the cells to internal shorting. Essentially these cells comprise a porous electrolyte matrix having a thin, lightweight electrode at each surface of the matrix.

Considerable attention has been directed to fuel cells and fuel cell components in recent years in an effort to obtain improved sources of electrical energy. Essentially, a fuel cell is an electrochemical device in which part of the energy of a chemical reaction is converted directly into direct current electrical energy. One of the more significant advantages of fuel cells over conventional methods of generating electricity is the directness by which chemical energy is converted into electrical energy, eliminating the necessity of converting energy into heat and thereby avoiding the inefficiencies associated with the Carnot heat cycle. Other advantages include quietness, cleanliness, and the reduction or the complete elimination of moving parts.

In the construction of fuel cells, it is necessary to stack a plurality of fuel cells together in electrical association in order to obtain the required current and voltage characteristics. To conserve space, cells have been constructed utilizing a very thin, porous matrix for retaining electrolyte, with a lightweight electrode positioned at each surface of this matrix. Reference is made, for example, to the cells defined in U.S. Pat. No. 3,419,900 and to the cells defined in British Pat. No. 935,415. In the 3,419,900 patent, an electrode is provided comprising an admixture of metal powder and hydrophobic polymer rolled into a mesh, with two electrodes of the cell separated by an electrolyte matrix. In British Pat. No. 935,415, a hydrophilic polymer sheet is coated at each surface with a thin, conductive catalyst layer to provide a very compact cell.

SUMMARY OF THE INVENTION

In accordance with the present invention, a composite electrolyte matrix/electrode assembly is provided wherein the electrolyte matrix can have a high porosity permitting the impregnation with substantial electrolyte, with there being no problem with internal shorting of the cell as a result of conductive catalysts from the electrodes at the opposite surfaces of the matrix contacting each other. Additionally, in the composite electrolyte matrix/electrode assembly of the present invention, the catalyst layer has a flat, uniform surface across the face of the electrolyte matrix, improving the geometric design of the cell and making more efficient use of catalyst.

In accordance with the present invention, a hydrophilic electrolyte matrix which can be a thin, fibrous mat of high porosity or a porous polymer membrane is filled with a completely volatile filler such as water. The filler is solidified within the pores of the electrolyte matrix; for example in the case of water by lowering the temperature below 0°C. While the electrolyte matrix is filled with the volatile substance in the solidified form, a catalyst layer is applied to each surface of the matrix. The layer can be applied from, or as, an aqueous suspension of electrocatalyst such as platinum and a hydrophobic polymer such as colloidal polytetrafluoroethylene by spraying, brushing, or as a paste. Thereafter, the resultant structure is treated, i.e., by gently heating, to remove the volatile substance and to sinter or bond the catalyst/polymer layer to the matrix. An electrode assembly is provided, with the internal pores of the matrix being free, or substantially free, of catalyst with the catalyst layer forming a flat, uniform surface on the polymer matrix. By using this technique, matrix materials which are extremely thin and/or highly porous can be utilized in the formation of fuel cells without problems associated with impregnation or migration of catalyst through the pores of the matrix causing internal shorting.

The electrolyte matrix which is to be employed herein can be any of the number of materials previously known for this use, including asbestos mats, fibrous polymeric materials, polymer membranes, ceramic materials, and the like, which have a porous structure and which will accept an electrolyte material and is resistant to the operating conditions of the cell. Preferably, matrices of asbestos, fibrous cloth or mats, glass, or cellulose are utilized. Reference is made to the aforesaid British Pat. No. 935,415 and to U.S. Pat. No. 3,297,484 for suitable matrix materials.

The catalyst layer, which can be utilized according to the present invention, can be any electrochemically active material capable of being bonded to the electrolyte matrix. Because of bonding characteristics, as well as the excellent electrochemical performance characteristics, a preferable catalyst layer includes an electrocatalytic material in admixture with a hydrophobic polymer. The catalytic material can be any of the electrochemically active metals such as nickel, iron, gold, platinum, palladium, ruthenium, rhodium, iridium, alloys thereof, and the like. Suitable polymeric materials include polytetrafluoroethylene, polytrifluorochloroethylene, polyvinylfluoride, polyvinylidenefluoride, polytrifluoroethylene, and co-polymers thereof. Because of the exceptional electrochemical activity, platinum, palladium, and iridium are preferred catalysts; and because of the exceptional hydrophobicity and resistance to heat and corrosive environment of the cell, polytetrafluoroethylene is the preferred polymer.

The catalyst loading which is utilized in the electrodes is conventional and preferably will be from about 0.1 mg/cm$^2$ of electrode surface up to about 10 mg/cm$^2$ of catalyst surface. Normally, it is desirable to use as low a catalyst loading as possible in view of the cost of the catalyst. However, for certain applications where cost is not a factor, high catalyst loadings up to and above 35 mg/cm$^2$ of catalyst can be employed.

In practicing the present invention, preferably a conductive metal support will be applied to the catalyst layer after the catalyst layer is applied to the electrolyte matrix; or, alternatively, the catalyst layer can be applied to the electrolyte matrix after it has been sprayed onto or rolled into a conductive support by compressing such unit onto the electrolyte matrix while the volatile material is solidified within the matrix. The metal support, if utilized, must be highly conductive and resistant to the environment of the fuel cells. Preferable supports are metal screens, expanded metal, porous metal or carbon sinters, metal felt or mesh. These supports are preferably from about 0.5 to 1.0 millimeter thick.

The volatile filler which is employed herein is preferably water. However, other materials can be utilized in practicing the present invention including organic filler materials which can be gasified, preferably below about 300°C. Gasification can be either by sublimation or vaporization at temperatures which do not detrimentally affect the characteristics of the matrix material. Materials which are suitable, in addition to water, include ammonium oxalate, ammonium carbonate, and polymers which have a low decomposition point. In addition to protecting against impregnation of catalyst through the matrix, the volatile material, when gasified, can improve the porous nature of the electrode.

A preferred example of the invention is as follows:

A fibrous asbestos matrix, 15 millimeters thick, is uniformly impregnated with water. While impregnated, the fibrous matrix is cooled to −10°C. to completely solidify the water. Thereafter, a uniform suspension of polytetrafluoroethylene and platinum black is applied to each surface of the matrix. The suspension comprises 70 percent platinum black and 30 percent colloidal polytetrafluoroethylene. The coating is applied to provide a catalyst loading of 4 mg/cm$^2$. After gentle pressing of the catalyst layers into the matrix, the structure is gently heated to a maximum temperature of about 280°C., at which temperature the solidified water is completely removed and the polymer catalyst layer bonded to the matrix. A cross-section of the electrode establishes that the catalyst layer is a substantially flat line across the electrode surface.

As will be apparent to one skilled in the art, the illustrative example is only set forth as being a preferred embodiment of the invention. The invention is not to be construed as being limited thereby. It is possible to produce various other embodiments without departing from the inventive concepts herein described. Such embodiments, being within the ability of one skilled in the art, are within the scope of the appended claims.

It is claimed:

1. The method of constructing a lightweight electrode comprising the steps of filling a hydrophilic porous matrix with a fluid volatile substance; solidifying said volatile substance within the pores of said matrix; applying a catalyst layer to at least one surface of said matrix, and thereafter removing the volatile substance.

2. The method of claim 1 wherein the volatile substance is water.

3. The method of claim 2 wherein the matrix is a fibrous mat.

4. The method of claim 3 wherein the catalyst layer is applied from a suspension of electrocatalyst and hydrophobic polymer.

5. The method of claim 4 wherein the hydrophobic polymer is polytetrafluoroethylene.

6. The method of claim 5 wherein the catalyst is platinum black.

7. The method of claim 4 wherein the catalyst layer is applied to both surfaces of the matrix.

8. The method of claim 1 wherein the filler is an organic compound which will gasify below about 300°C.

9. The method of claim 8 wherein the filler is ammonium oxalate.

10. The electrode made by the method of claim 4.

* * * * *